US006791449B2

(12) United States Patent
Dewan

(10) Patent No.: US 6,791,449 B2
(45) Date of Patent: Sep. 14, 2004

(54) REMOTE CONTROL FOR MULTIPLE VEHICLES

(76) Inventor: Raman N. Dewan, 8509 Navidad Dr., Austin, TX (US) 78735

( * ) Notice: Subject to any disclaimer, the term of this patent is extended or adjusted under 35 U.S.C. 154(b) by 472 days.

(21) Appl. No.: 09/803,253

(22) Filed: Mar. 9, 2001

(65) Prior Publication Data

US 2001/0035811 A1 Nov. 1, 2001

Related U.S. Application Data

(60) Provisional application No. 60/188,261, filed on Mar. 10, 2000.

(51) Int. Cl.[7] .............................................. G05B 19/00
(52) U.S. Cl. ................. 340/5.25; 340/426.11; 340/426.13; 340/426.14; 340/426.28; 340/426.38; 340/825.69; 340/825.72; 340/825.22
(58) Field of Search .......................... 340/5.25, 426.11, 340/426.13, 426.14, 426.28, 426.36, 825.69, 825.72, 825.22; 307/10.1, 10.2, 10.4; 341/176

(56) References Cited

U.S. PATENT DOCUMENTS

| 6,181,255 | B1 | * | 1/2001 | Crimmins et al. | ...... 340/825.69 |
| 6,188,326 | B1 | * | 2/2001 | Flick | ...................... 340/825.69 |
| 6,377,173 | B1 | * | 4/2002 | Desai | ...................... 340/426.36 |

* cited by examiner

Primary Examiner—Ario Etienne
Assistant Examiner—Yves Dalencourt
(74) Attorney, Agent, or Firm—Joseph P. Lally; Raman N. Dewan

(57) ABSTRACT

A key fob for use in accessing first and second motor vehicles includes a portable housing defining a hole for receiving a key chain and first and second motor vehicle selector buttons connected to integrated circuit logic within the housing and accessible through the housing. The fob further includes at least one function selector button connected to the integrated circuit logic and accessible through the housing. The integrated circuit logic is configured to select the first or second motor vehicle upon activation of the first or second motor vehicle selector buttons respectively. The integrated circuit logic controls a lock of the selected motor vehicle upon activation of the function selector button.

8 Claims, 3 Drawing Sheets

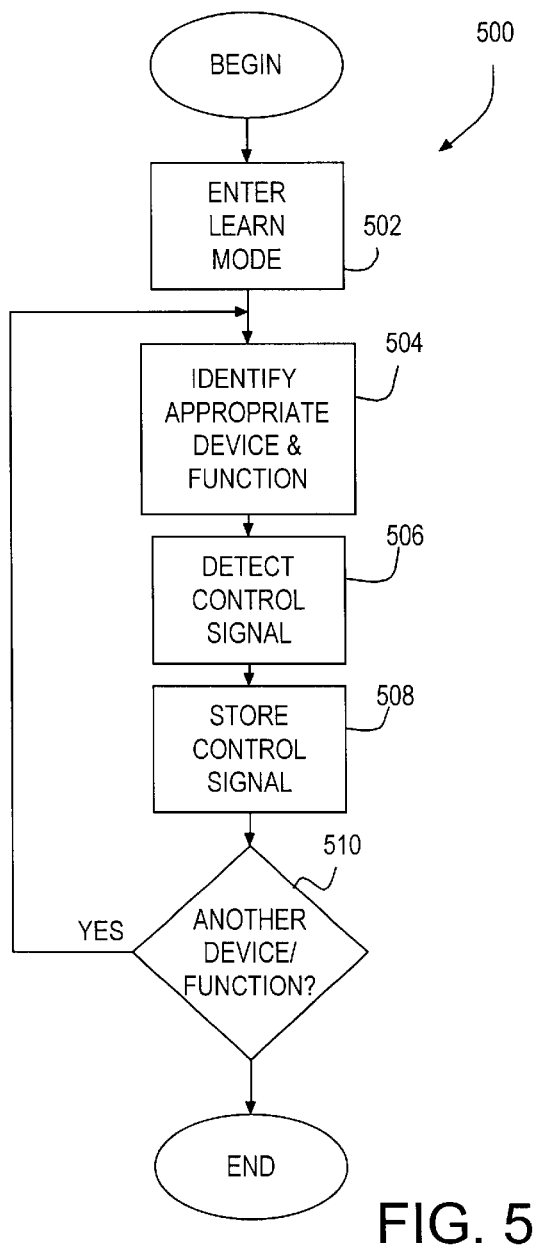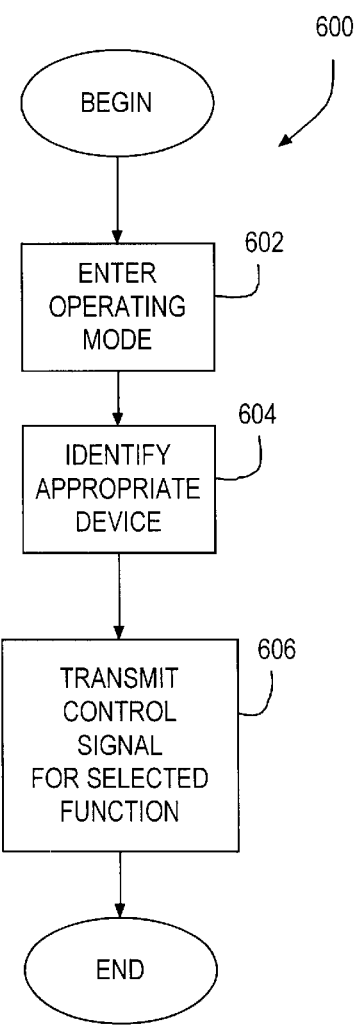
FIG. 5
FIG. 6

REMOTE CONTROL FOR MULTIPLE VEHICLES

CROSS REFERENCE

This application claims priority under 35 USC § 119(e)(1) from provisional application No. 60/188,261 filed Mar. 10, 2000.

BACKGROUND

1. Field of the Present Invention

The present invention generally relates to the field of remote control and more particularly to a remote control device for controlling a plurality of functions on two or more similar devices such as automobiles or other vehicles.

2. History of Related Art

In the field of electronics, remote control devices are well known. Typically, remote control systems utilize infrared (IF) or radio frequency (RF) signals to operate an electronic device from a remote position. Typically, remote control systems are suitable for operating a single device such as a television or multiple devices of different types such as a television, VCR, DVD player, and cable box. Remote entry devices are also available to perform such functions as disabling security alarms and unlocking the doors and trunks of an automobile. Typically, these remote control devices have a size and bulk that is comparable to the automobile's key to prevent the remote control device from being accidentally misplaced. It is becoming increasingly common for households to posses multiple vehicles, each of which is equipped with a remote entry system operated by a remote control device commonly referred to herein as a key fob or fob. In households that have more than one vehicle operated by a remote entry system, the size and bulk of the fobs can make it difficult for a single user to posses a fob for each of the household's vehicles on a single key chain. Therefore, it would be desirable to implement a key fob or other suitable remote control device that operated a plurality of like devices such as automobiles or other vehicles. It would be further desirable if the implemented device were able to control a variety of functions for each of the devices. It would be still further desirable if the implemented device was not significantly more expensive than a conventional key fob.

BRIEF DESCRIPTION OF THE DRAWINGS

Objects and advantages of the invention will become apparent upon reading the following detailed description and upon reference to the accompanying drawings in which:

FIG. 5 is a flow diagram illustrating operation of a remote control device in a learn mode according to one embodiment of the present invention; and FIG. 6 is a flow diagram illustrating operation of a remote control device in an operating mode.

Figure 1:
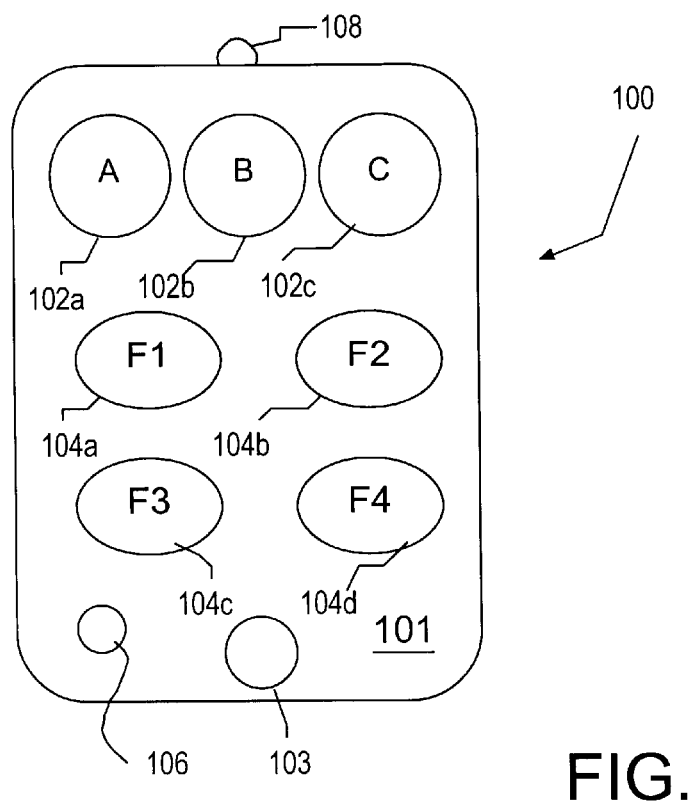
FIG. 1 is an illustration of a key fob according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE DRAWINGS

Turning now to the drawings, FIG. 1 illustrates a remote control device (fob) 100 according to one embodiment of the present invention. As depicted in FIG. 1, remote control device 100 includes a portable housing 101 typically fabricated of plastic or other suitable material and suitable for encompassing one or more selector buttons. Typically, portable housing 101 includes a hole (or slot) 103 for receiving a key chain and encloses one or more electronic components (integrated circuits) mounted on a substrate such as a printed circuit board, printed wiring board, or other suitable material. The electronic components of remote control device 100 are suitably activated via selector buttons that are accessible to the user.

In the depicted embodiment, remote control device 100 includes a mode selector button 106. Preferably, mode selector 106 is suitable for transitioning remote control device 100 between a first mode and a second mode. In the first mode, remote control device 100 is adapted to learn a signal or code from an external fob or other remote control system. Preferably, the signal or code that is learned while device 100 is in the first mode is suitable for controlling at least one function of at least one external device. As an example, upon entering a first learn mode when a user activates or depresses mode selector 106, remote control device 100 may learn the signal used to unlock the passenger doors for a first automobile.

After learning one or more functions associated with one or more devices, subsequent activation of mode selector 106 transitions the remote control device 100 from a learn mode to an operating mode in which remote control device 100 is able to perform the one or more functions that remote control device 100 has learned while in the learn mode. (Alternatively, mode selector 106 enters the operating mode state following a predetermined time period.) As an illustration, after learning the code or signal used to unlock the passenger doors of a first vehicle, activating mode selector 106 transitions remote control device 100 to an operating mode in which remote control device 100 is able to lock and unlock the passenger doors of the first vehicle upon proper activation of the remaining selector keys (buttons) on device 100.

Remote control device 100 includes at least one device selector and at least one function selector. In the depicted embodiment, remote control device 100 includes device selectors 102a, 102b, and 102c (generically or collectively referred to herein as device selector(s) 102) and function selectors 104a, 104b, 104c, and 104d (generically or collectively referred to herein as function selector(s) 104). When in an operating mode, remote control device 100 is suitable for controlling various functions of various devices by proper operation of device selectors 102 and function selectors 104. More specifically, the preferred embodiment of remote control device 100 as depicted in FIG. 1 is suitable for performing various functions on a first device by activating (when device 100 is in the operating mode) the first device selector 102a and thereafter activating the appropriate function selector 104a, 104b, 104c, or 104d. Remote control device 100 is further suitable for controlling various functions on a second device by activating (when in the operating mode) second device selector 102b and thereafter activating the appropriate function selectors 104. Remote control device 100 may be configured such that functions associated with each function selector 104 remain consistent regardless of which device is currently selected. Thus, if the first function selector 104a controls the door lock mechanism for a first vehicle, it will also control the door lock mechanism for a second vehicle when the second vehicle is selected through appropriate activation of device selectors 102. The depicted embodiment of remote control device 100 is further capable of controlling various functions of a third device by activating third device selector 102c and thereafter activating the appropriate function selectors 104.

Figure 2:
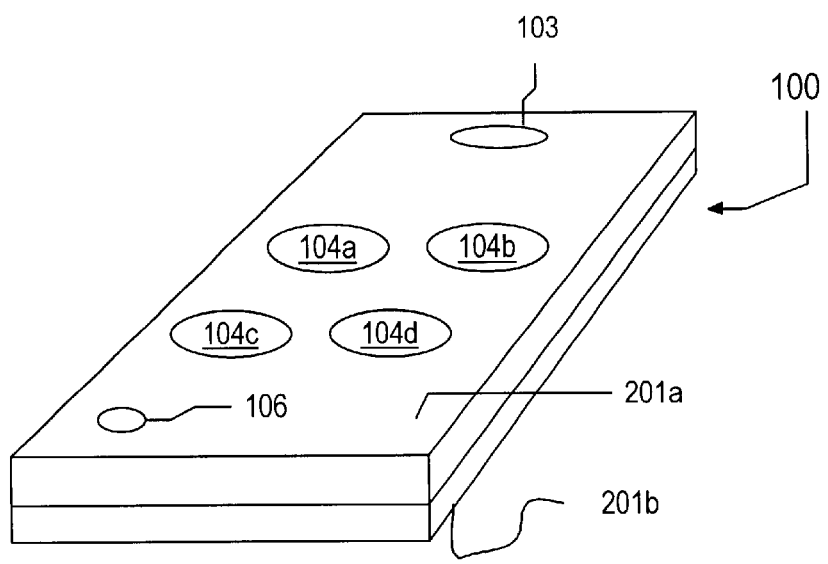
FIG. 2 illustrates an embodiment of a key fob system according to the present invention in which each face of the key fob operates a different vehicle.

Turning now to FIG. 2, an embodiment of the invention is depicted in which a first face 201a of remote control device 100 includes a first set of function selectors 104a, 104b, 104c, and 104d that control functions of a first vehicle (or other device), while a second face 201b of remote control device 100 includes a second set of function selectors (not shown) that control a set of functions for a second device. In one embodiment, remote control device 100 of FIG. 2 is color coded such that first face 201a has a first color while second face 201b has a second color. (The same differentiation may occur through a tactile difference in first face 201a and second face 201b; e.g., first face 201a may be rough while second face 201b may be smooth.) This embodiment of the invention facilitates the user's ability to differentiate between a first vehicle controlled by device 100 and a second vehicle thereby eliminating the need for a device selectors 102 there by simplifying operation of the devices.

Figure 3:
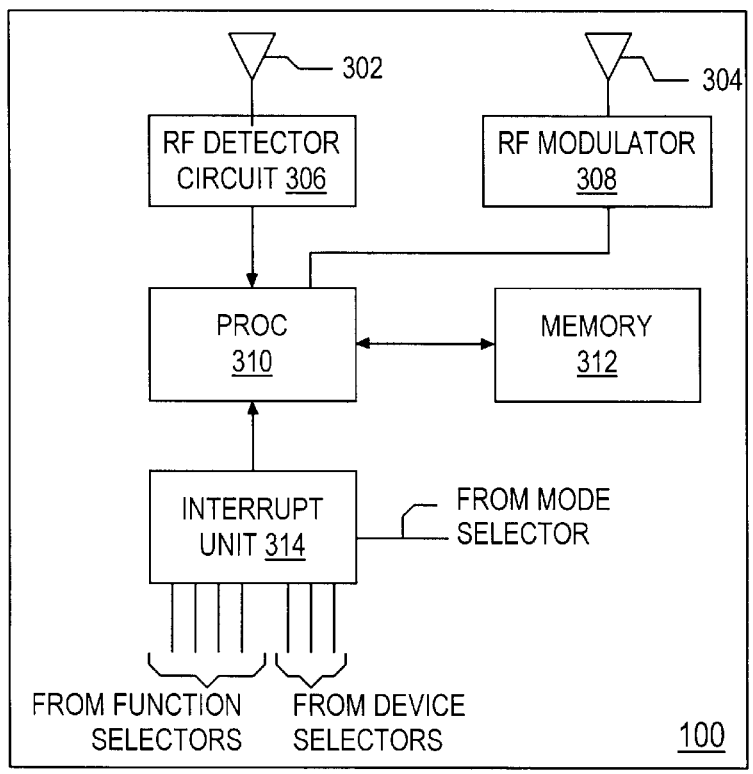
FIG. 3 is a simplified block diagram of the key fob system according to one embodiment of the present invention.

Turning now to FIG. 3, a block diagram illustrating major functional components of one embodiment of remote control device 100 is presented. Device 100 includes integrated circuit logic connected to a printed circuit board enclosed within the device housing. As depicted in FIG. 3, the integrated circuit logic of remote control device 100 includes a processor 310 enabled to receive a signal or code from an external source. In the depicted embodiment, processor 310 is connected to an RF detector circuit 306 suitable for demodulating an RF signal received by antenna 302. In one embodiment, for example, the received signal includes a device or function code modulated onto an RF carrier wave and RF circuit 306 is enabled to extract the baseband signal (i.e., the function code or device code) from the received signal. Processor 310 may be further connected to a transmitting antenna 304 through a modulating circuit 308 such that remote control device 100 is enabled to generate an RF signal that includes a function code modulated onto a carrier wave. In the preferred embodiment, a suitable storage facility such as the memory 312 depicted in FIG. 3 is accessible to processor 310. Although illustrated as a single block for purposes of clarity and simplification, memory 312 may include a random access memory (RAM) portion and a non-volatile (EEPROM) portion. In this embodiment, the EEPROM portion may contain an operating portion of the memory and may further contain the signals learned by remote control device 100.

The depicted embodiment of remote control device 100 further includes an interrupt controller 314 connected to processor 310. Interrupt controller 314 detects the activation of a selector buttons and forwards an interrupt to processor 310 that indicates the activated selector button. With respect to the embodiment of remote control device depicted in FIG. 1, for example, interrupt controller 314 would include an input for each of the function selectors 104, each of the device selectors 102, and the mode selector 106.

Figure 4:
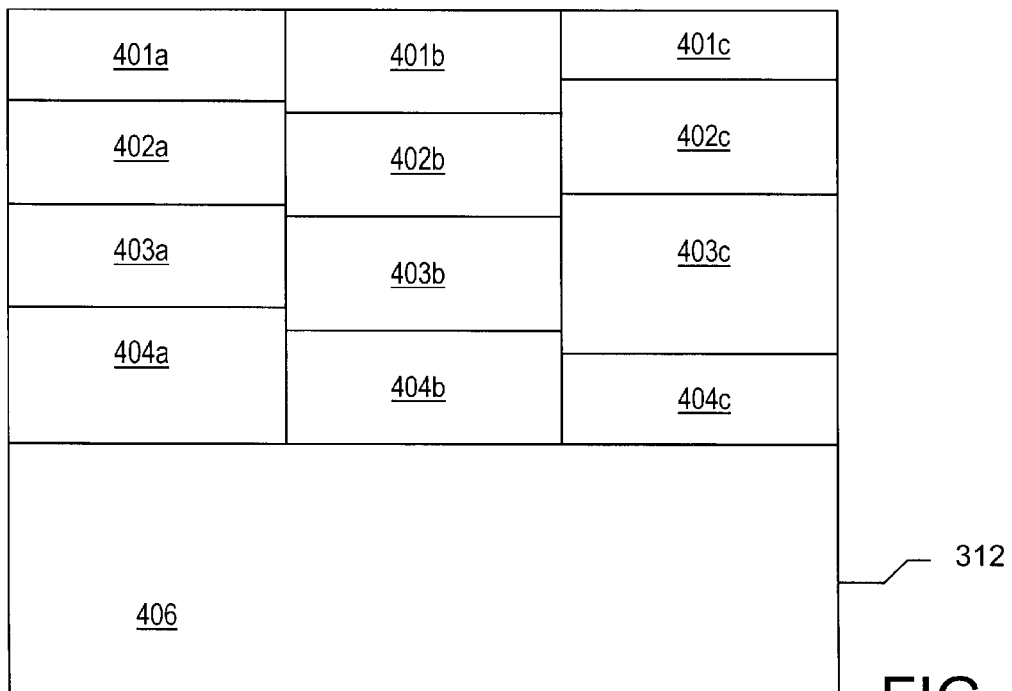
FIG. 4 is a representative illustration of the memory of the system depicted in FIG. 3 according to one embodiment of the invention.

Responsive to receiving an interrupt from interrupt controller 314, processor 310 initiates an appropriate action depending upon the selector button that was activated. In one embodiment, processor 310 initiates the execution of a sequence of processor executable instructions stored in memory 312 in response to the activation of a particular sequence of selector buttons. Referring to FIG. 4, a conceptualized representation of memory 312 is presented. In the depiction, memory 312 is represented as being divided into an array of code segments corresponding to the various combinations of function selector buttons 104 (referring back to FIG. 1) and device selector buttons 102. When remote control device is in its operating mode (through time lapse or appropriate activation or of mode selector 106) code segment 401a, for example, corresponds to the code segment that processor 310 executes in response to detecting the activation of the "A" device selector 102a and the "F1" function selector 104a. When remote control device is in its learn mode through activation of mode selector 106, the signals or codes that are received from an external device are stored in the corresponding segment of memory 312. Thus, for example, if remote control device 100 is learning the signal for the second function (F2) of a third device (C), the learned signal would be stored in memory segment 402c.

In one embodiment, the location of the appropriate code segments to be saved or retrieved (depending upon whether remote control device 100 is in learn mode or operating mode) is indicated by the interrupt received by processor 310 from interrupt controller 314. In this embodiment, for example, interrupt controller 314 generates a value based upon the received inputs and forwards the value to processor 310. Processor 310 uses the value received from interrupt unit 314 as an address into memory 312. In one embodiment, the code segments 401a, 401b, 401c, 402a, and so forth contain only a digital representation of the digital signal that will ultimately be transmitted to an external device. In this embodiment, memory 312 includes an operating code segment identified in FIG. 4 by reference numeral 406 that is used by processor 310 to control the behavior of remote control device 100. Operating code 406, for example, may include instructions that control the behavior of processor 310 upon receiving information from interrupt controller 314 as well as the behavior of processor 310 upon receiving a signal from RF detector circuit 306. This embodiment enables efficient use of memory 312 by storing only a single copy of operating code that is used by processor 310 regardless of the device or function currently being controlled. It should be noted that the learning mode is an optional feature of control device 100 and that the appropriate code segments may be loaded into memory by the vehicle manufacturer's authorized agent.

An example of the contemplated operation of remote controlled device 100 is illustrated in FIG. 5 and FIG. 6. Referring to FIG. 5 specifically, a method 500 of operating remote control device 100 in a learn mode is illustrated. Initially, the learn mode is entered (step 502) by appropriate activation of mode selector 106. In one embodiment, remote control device 100 includes a light emitting diode (LED) 108 that is used to confirm the completion of certain actions. In one embodiment, for example, LED 108 flashes an appropriate signal to confirm that the user has successfully entered learn mode. To prevent inadvertent activation of the learn mode, remote control device 100 may be configured to require sustained or intentional activation of mode selector 106 before entering the learn mode. After entering the learn mode, the user identifies a first device and function (step 504) by selecting one of the device selectors 102 and one of the function selectors 104. If, for example, the user wishes to learn the signal required to operate the automatic door lock mechanism on a first vehicle, the user may activate, after entering learn mode, first device selector 102a and the first function selector 104a. In an embodiment of remote control devices 100 that incorporate LED 108, the successful activation of a device selector 102 and a function selector 104 is confirmed by appropriately flashing LED 108 in a predetermined manner. After the appropriate device and function have been selected, remote control device 100 detects the appropriate control signal (step 506) and stores the detected control signal in the appropriate segment of memory 312. Continuing with the previous example in which the user is learning the control signal for the automatic door lock mechanism of a first vehicle, the user executes step 506 of method 500 by placing an external key fob or other remote controlled unit of a first vehicle in close proximity to remote control device 100 and activating the appropriate button (i.e., the door lock button) of the external key fob. The remote control device 100 may signal the user that the control signal from the external key fob has been received by flashing LED 108 in a predetermined manner. Remote control device 100 may further include a learn selector (not depicted in FIG. 1) that the user must activate during the actual learning of a control signal. Use of such a learn selector may be desirable to prevent inadvertent learning of external control signals.

After detecting the appropriate control signal in step 506, remote control unit 100 stores (step 508) the detected controlled signal in the corresponding code segment of memory 312. In the example in which the control signal is learned for a first function of a first device, the detected control signal is stored in code segment 401*a*. After learning a particular control signal, the decision in step 510 indicates that remote control device 100 may learn a second function associated with the first device by activating a second function selector (such as function selector 104*b*) and thereafter using the external key fob to send a second signal (such as the signal to activate an automatic trunk lock mechanism) to remote control device 100. In this manner, the user may learn one or more functions associated with the first device. After learning some or all of the desired functions for a first device, the user can then use remote control device 100 to learn control signals corresponding to a second device by activating a second device selector (such as device selector 102*b*) while still in the learn mode. After remote control device 100 acknowledges the activation of the second device selector through appropriate signaling of LED 108, the user can place a second external key fob in close proximity to remote control device 100, activate a function selector on remote control device 100, and activate the appropriate function on the second external key fob. In this matter the user can learn various control signals for multiple devices and store each of the control signals in dedicated portions in memory 312. Unlike conventional universal remote control devices, remote control device 100 is suitable for controlling multiple devices of the same type such as two or more motor vehicles. By enabling the control of a set of like devices, remote control device 100 enables the user to eliminate one or more key fobs from his or her personal possession.

FIG. 6 illustrates a method of operating remote control device 100 in its operating mode. Initially, the user enters the operating mode (step 602) by lapse of time or appropriate activation of mode selector 106. In embodiments with an LED 108, remote control device 100 can signal the user upon successfully entering the operating mode. After entering the operating mode, the user identifies (step 604) the device that he or she wishes to control through the appropriate activation of device selectors 102. In one embodiment, control device 100 is configured to indicate visually the currently selected device through the use of an appropriate mechanical, electrical, or electromechanical signaling device.

After selecting the desired device, the user can then remotely control one or more functions of the selected device by activating the appropriate function selector 104 in the vicinity of the selected device. If the user wishes to control the functions of a second device, the user simply activates a second device selector (while in the operating mode) and a desired function selector. The remote control device enables simple control of multiple devices by enabling the user to dedicate specified function selectors consistently for each device such that the function selector that controls a particular function on one device controls the same function on each device for which remote control device 100 is programmed. In one embodiment, function selectors 104 may include universal symbols to identify the functionality associated with the corresponding function selector 104.

It is understood that the form of the invention in the detailed description and the drawings are to be taken merely as presently preferred examples.

What is claimed is:

1. A key fob, comprising:
    a portable housing comprising a first face and a second face;
    integrated circuit logic enclosed within the housing;
    a first function selector button connected to the integrated circuit logic and accessible through the first face of the housing;
    a second function selector button connected to the integrated circuit logic and accessible through the second face of the housing;
    wherein the integrated circuit logic is configured to select a first motor vehicle upon activation of the first function selector button and further configured to control a function of the first motor vehicle upon activation of the first function selector button; and
    wherein the integrated circuit logic is configured to select a second motor vehicle upon activation of the second function selector button and further configured to control a function of the second motor vehicle upon activation of the second function selector button.

2. The key fob of claim 1 wherein the housing defines a hole for receiving a key chain.

3. The key fob of claim 1 wherein for identification purposes the first face is configured with a first color and the second face is configured with a second color.

4. The key fob of claim 1 wherein for identification purposes the first face is configured with a first texture and the second face is configured with a second texture.

5. The key fob of claim 1 further comprising:
    memory connected to the integrated logic; and
    wherein the integrated logic is configured to enter into a learn mode for detecting a first and second control signal for controlling a function of a first and second motor vehicle respectively and storing each of the detected first and second control signals in the memory and further configured to associate the stored first and second control signals with the first and second function selector buttons respectively.

6. The key fob of claim 3 further comprising:
    a signaling device; and
    wherein the signaling device is configured to indicate when the learn mode has been entered into.

7. The key fob of claim 3 further comprising:
    a signaling device; and
    wherein the signaling device is configured to indicate when the integrated logic has successfully detected, stored, and associated the at least one control signal with its corresponding function selector button.

8. The key fob of claim 3 further comprising:
    a signaling device; and
    wherein the signaling device is configured to indicate when the learn mode has been exited.

* * * * *